United States Patent [19]

Arnold et al.

[11] 4,067,560

[45] Jan. 10, 1978

[54] CHUCK, IN PARTICULAR MACHINE VISE

[76] Inventors: Franz Arnold, Spatzenweg 20, 8960 Kempten, Germany; Angel Lanas, C/Bidebarri, 19-3°, Algorta (Vizcaya), Spain

[21] Appl. No.: 800,233

[22] Filed: May 25, 1977

[30] Foreign Application Priority Data

June 14, 1976 Germany ........................ 7618800[U]

[51] Int. Cl.$^2$ ................................................ B23Q 3/08

[52] U.S. Cl. ....................................................... 269/32

[58] Field of Search ......................... 269/20, 24, 27, 32

[56] References Cited

U.S. PATENT DOCUMENTS

| | | | |
|---|---|---|---|
| 2,708,381 | 5/1955 | Olson | 269/32 |
| 3,752,464 | 8/1973 | Csatlas | 269/32 |
| 3,927,872 | 12/1975 | Sessody | 269/32 |

*Primary Examiner*—Robert C. Watson

*Attorney, Agent, or Firm*—Blanchard, Flynn, Thiel, Boutell & Tanis

[57] ABSTRACT

A fluid operated machine vise having a fixed jaw and a movable jaw. The movable jaw includes a hollow spindle threadedly engaged therewith so that upon rotation of the hollow spindle, the movable jaw will be moved toward and away from the fixed jaw. A fluid operated mechanical power amplifier is provided and is connected in association with the movable jaw so that upon application of force by the mechanical power amplifier to the movable jaw, forces greater than would be normally achieved are produced. A stop is provided for limiting the maximum clamping force. The stop limits the effective stroke length of the mechanical power amplifier.

10 Claims, 6 Drawing Figures

CHUCK, IN PARTICULAR MACHINE VISE

FIELD OF THE INVENTION

The invention relates to a chuck, in particular a machine vise comprising a hollow spindle which is threadedly engaged with a stationary vise part, a pressure rod which is axially movably supported in said hollow spindle and which exerts the clamping pressure, a hydraulic or mechanical power amplifier which is arranged in a cylindrical housing which is connected to the hollow spindle, the secondary member of said power amplifier acting onto the pressure rod and the primary member of said power amplifier being under the power of an air-operated piston, which itself is arranged in an air cylinder which follows the power amplifier housing and is fixedly connected to same, wherein the air cylinder has at its rear end not facing the hollow spindle a plate which seals off the cylinder arm, at the rear face of which plate there sealingly abuts a rotary slide valve which can be rotated with respect to the plate between two end positions and which is coaxial to said plate, in the first end position of which rotary slide valve an axial air-supply opening, which is constantly in connection with a compressed-air source, is in alignment with a first axial opening of the plate, which leads into the cylinder chambers and in the second end position of which rotary slide valve an axial vent is connected to a corresponding axial opening of the plate and engaging means are provided for a handcrank on the rotary slide valve and between the rotary slide valve and the plate there is provided a spring-loaded torque coupling which holds the rotary slide valve in the ventilating position.

BACKGROUND OF THE INVENTION

In such a known chuck (known from German OS No. 23,43,723), a plate has a central opening therein and the rotary slide valve has a pivot pin which is received in the opening. The rotary slide valve is secured against axial shifting with respect to the plate by means of a resilient retaining ring (Seeger ring) which engages in the cylinder chamber the pivot pin. This retaining ring is, however, unable to ever create a sealing connection between the mutually facing plane face of the plate and the plane face of the rotary slide valve. Even if during manufacture the most narrow tolerances would be able to be maintained, with time wear would result from the rotary movement of the rotary slide valve with respect to the plate. A sealing connection between the plane face of the plate and the plane face of the rotary slide valve which faces said plate is not assured therewith. However, this sealing connection is particularly important. Furthermore in the known chuck there is provided as a torque coupling a ball which is movable against spring force in an axial opening of the rotary slide valve, and which ball engages a conical recess of the plate and holds the rotary slide valve in ventilating position with respect to the plate. The ventilating opening is in alignment in said ventilating position with a corresponding axial opening of the plate. If a handcrank which engages the engaging means of the rotary slide valve is rotated, then this torque coupling first assures that the rotary slide valve takes along also the plate, the air cylinder, the power amplifier housing which is fixedly connected to said air cylinder and the hollow spindle which is also fixedly connected to the power amplifier housing. In this manner occurs first in a machine vise the feeding of the movable chuck jaw to the workpiece. As soon as same abuts against the workpiece, the torque which is needed for the further rotation of the hollow spindle is increased. The torque coupling disengages and the rotary slide valve is rotated by means of the handcrank relative to the now resting plate. Through this the airsupply opening of the rotary slide will be connected to the axial opening of the plate which terminates in the cylinder chamber, and thus compressed air is supplied into said cylinder chamber to cause the air-operated piston to be moved and to apply an increased force onto the pressure rod through the power amplifier. This manner of functioning is correct in the case of substantially incompressible workpieces. A chucking of flexible workpieces, as for example a sheet metal package is, however, not possible with this known chuck because the torque coupling disengages, as soon as the movable chuck jaw comes to rest on the first workpiece. Furthermore it is also not possible in the case of the known chuck to adjust the achievable maximum clamping pressure in a simple manner.

The basic purpose of the invention is primarily to produce a chuck of the abovementioned type in which without enlargement of the dimensions, be it in radial or axial direction, a perfect seal of the rotary slide valve with respect to the plate without effecting the remaining manner of operation of the chuck is always assured. A further development of the invention has furthermore also the basic purpose of making it possible to clamp flexible workpieces, as for example sheet-metal packages. Furthermore also in a further development of the invention the clamping pressure is adjustable in stages in a simple manner.

The basic purpose is achieved according to the invention by the rotary slide valve being arranged in a sleeve which concentrically surrounds the rotary slide valve and which is connected to the air cylinder at its one end through a fine thread and which is secured against rotation after axial adjustment, which sleeve has at its other end a radially inwardly directed flange or the like and between said flange and the rotary slide valve there is provided an initially tensioned axial ball bearing.

A perfect seal between the plane surface of the rotary slide valve and the face of the plate is assured by this new arrangement. This perfect seal assures a perfect function of the entire chuck. The perfect seal between the two parts avoids an escaping of compressed air and thus an unintentional opening of the chuck or loosening of the workpiece which is chucked with the chuck. By means of the fine thread which is provided between the sleeve and the air cylinder, the initial tension of the axial ball bearing can take place very sensitively independent from any kind of manufacturing tolerances and any play can be excluded and, in addition, however, also the reciprocal rotatability of the plate and rotary slide valve is maintained. Only after adjustment of the initial tension has occurred the air cylinder and the sleeve are secured against rotation so that the initial tension is maintained.

In an advantageous further development of the invention, an axially resilient ring is provided between the flange and the ball bearing. Same assures that even with a certain amount of wear of the plate and the rotary slide valve, at all times a sealing abutment of both parts will occur.

The axially resilient ring is preferably a cup spring. This cup spring can form at the same time one bearing ring of the ball bearing and can be supported with its inner edge on the flange while the rotary slide valve consists of hardened material and has a shoulder on which the balls are directly supported. Through this structure not only the number of individual parts is reduced but also a particularly compact structure is achieved. The rotary slide valve must be hardened at any rate and the cup spring is a hardened part which easily can take the occurring ball bearing loads.

In place of a cup spring, the axially resilient ring can be constructed V-shaped in cross section, can be supported with its apex on the flange of the rotary slide valve and can form with its two V-legs bearing surfaces for the balls while the rotary slide valve consists of hardened material and has a shoulder on which the balls are directly supported. This ring which in cross-section is V-shaped assures at small structural dimensions and with few individual parts an elastic initial pretension between the rotary slide valve and plate.

BRIEF DESCRIPTION OF THE DRAWINGS

The invention will be discussed more in detail hereinafter with reference to the several exemplary embodiments which are illustrated in the drawings, in which.

DETAILED DESCRIPTION

Figure 1:
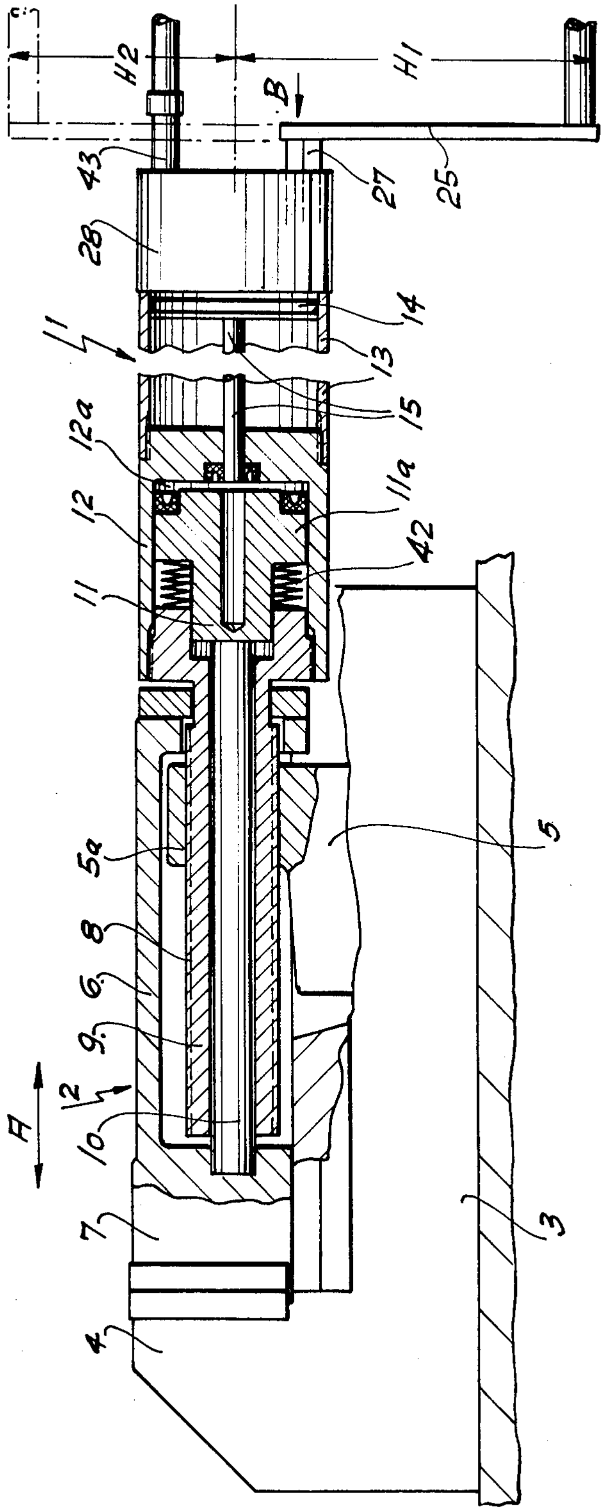
FIG. 1 is-a longitudinal cross-sectional view of a vise with the new chuck.

The entire chuck is identified with the reference numeral 1 in the drawings, which chuck is advantageously used on a machine vise 2. The stationary chuck jaw 4 is fixedly connected to the base plate 3 of this machine vise 2. The bearing block 5 which carries the spindle nut **5*a* is also securable in various positions on the base plate 3. The slide 6 which is movably supported on the base plate for movement in direction A carries the movable chuck jaw 7 therewith. The hollow spindle 9 of the chuck 1 which has an external thread 8 thereon is screwed into the spindle nut 5*a***.

The hollow spindle 9 has in a conventional manner a pressure rod 10 which is supported axially movably therein, which pressure rod 10 is supported with its front end engaging the movable jaw 7 and applies a clamping force to the jaw. The secondary member 11 of a conventional hydraulic power amplifier acts onto the rear end of the pressure rod 10. The secondary member 11 has a large-surface piston **11*a* which is movably guided in a cylindrical housing 12**.

An air cylinder 13 is fixedly screwed to the housing 12, which air cylinder has advantageously the same outer diameter as the housing 12. An air-operated piston 14 is movably guided in said air cylinder and has a piston rod 15 secured thereto and movable therewith. The piston rod 15 forms at the same time also the primary member of the hydraulic power amplifier. The piston rod 15 has compared to the air-operated piston 14 and also the piston **11*a* of the hydraulic power amplifier a relatively small diameter so that at a small outer diameter of the air cylinder 13** and an operating pressure of approximately 6 atu., which is available in the compressed air systems of many companies, a sufficiently high clamping force can be achieved.

The air cylinder 13 has at its rear end remote from the hollow spindle 9 a plate 17 which seals off the cylinder chamber 16 and the rear face **17*a* of the plate sealingly engages a rotary slide valve 18 which can be rotated with respect to the plate 17** between two end positions and is coaxial with respect to said plate.

Figure 5:
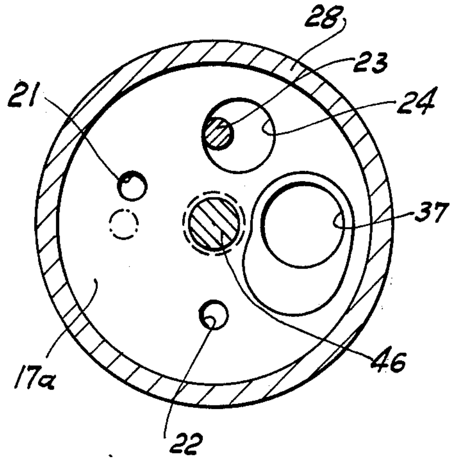
FIG. 5 is a partial longitudinal cross-sectional view taken along the line V—V of FIG. 2 in actual size.
Figure 6:
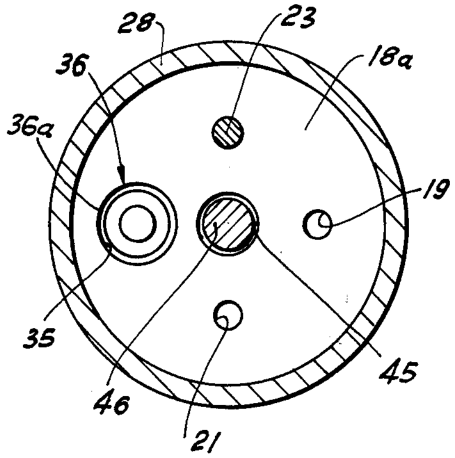
FIG. 6 is a partial longitudinal cross-sectional view taken along the line VI—VI of FIG. 2 in actual size.

The rotary slide valve 18 has an axially extending air-supply opening 19 which is constantly connected to a compressed-air source and which is in alignment in a first end position of the rotary slide valve 18 (clamping position) with a first axial opening 20 in the plate 17 (compare FIGS. 5 and 6).

Furthermore the rotary slide valve 18 has an axially extending vent 21 which is connected in a second end position (ventilating position) of the rotary slide valve 18 illustrated in FIGS. 2 to 5 to a corresponding axially extending opening 22 in the plate 17. The rotary motion of the rotary slide valve between the clamping position and the ventilating position is limited by an axial stop pin 23 which is received in a recess 24 in the plate 17, which recess has a correspondingly larger diameter.

Furthermore, engaging means for a handcrank 25 are provided in the rotary slide valve 18 and, in the illustrated exemplary embodiment, consist of a hexagonal recess 26 into which is received the corresponding hexagonally constructed crankpin 27 on the handcrank 25.

The cylindrical rotary slide valve 18 is arranged in and is concentrically surrounded by a sleeve 28. The sleeve 28 is connected at its one end through a fine thread 39 to the air cylinder 13. At its other end the sleeve 28 has a radially inwardly directed flange 29. Instead of the flange it would also be possible to arrange a retaining ring which consists of spring wire according to DIN 472 (Seeger ring) received in a groove of the sleeve 28. However, the use of the flange 29 is more space-saving. A cup spring 30 with its radially inner edge **30*a* is supported on the flange 29. A plurality of balls 31 rest on the cup spring 30 so that the cup spring 30 forms at the same time the bearing ring of a ball bearing. The rotary slide valve 18, which consists of hardened material, namely hardened steel, has a shoulder 32 thereon and on which the balls 31 also are directly supported. Due to the fact that the cup spring is supported with its inner edge 30*a* on the flange 29, it applies a radially inwardly directed force onto the balls 31 and thus causes the balls 31 to engage at all times the hardened rotary slide valve 18. By rotating the sleeve 28 relative to the air cylinder 13, it is possible to apply by means of the fine thread 39 any desired initial stressing force onto the cup spring 30 and thus onto the axial ball bearing. The initial stressing force assures that the plane surfaces 17*a* of the plate 17 and 18*a* of the rotary slide valve 18 are always pressed on one another and thus a perfect seal between both surfaces exists at all times. In addition, as wear occurs between these two surfaces 17*a*, 18*a*, this seal is maintained due to the initially tensioned ball bearing, in particular due to the cup spring 30. The sleeve 28 can after the initial axial adjustment be fixed to the air cylinder 13 by a radially extending set screw 33** in its rotary position.

Figure 3:
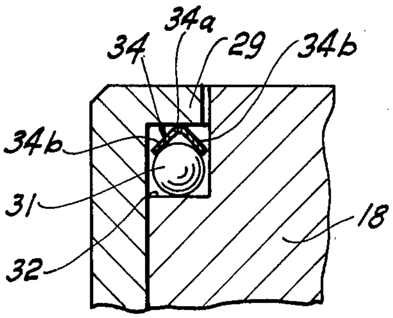
FIG. 3 is a fragmentary cross-sectional view of a particularly preferable ball bearing development.
Figure 4:
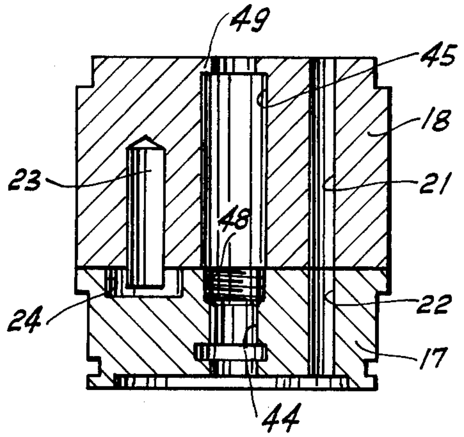
FIG. 4 is a second longitudinal cross-sectional view taken along the line IV—IV of FIG. 2 and of only the rotary slide valve and the plate in actual size.

In the exemplary embodiment which is illustrated in FIG. 3, in place of a cup spring an axially resilient ring 34 is provided and which has a V-shaped cross section. The ring 34 is supported with its apex **34*a*** on the flange 29 of the sleeve 28 and forms with its two V-legs 34b the bearing surfaces for the balls 31. The axially resilient ring 34 consists of spring steel. The rotary slide valve 18 consists itself of a hardened material and has just like in the above-described exemplary embodiment a shoulder 32 on which the balls 31 are directly supported.

The rotary slide valve 18 has furthermore an axially extending opening 35 which is arranged eccentrically with respect to its axis of rotation. A locking member which is constructed advantageously as a cylindrical locking bolt 36 is arranged axially movably in the axial opening 35. The locking bolt 36 is constructed frustrum-shaped at its front end 36a and the front end faces the plate 17. The locking bolt 36 engages with this frustrum-shaped end 36a a correspondingly conical recess 37 of the plate 17. The locking bolt has furthermore a central opening 38 in which a strain bolt 40 is movably guided. A pressure spring 41 is arranged in an enlargement 38a of the central opening 38 and is supported at one end on the shoulder of the enlargement 38a and at the other end on a flange 40a of the strain bolt 40. The already mentioned hexagonal recess 26 is an axial extension of the eccentrically arranged axial opening 35 and the diameter of the axial opening 35 is greater than the greatest diagonal of the hexagonal recess 26 which is in alignment with it. The crankpin 27 which engages the hexagonal recess 26 can thus also be moved into the axial opening 35.

OPERATION

The operation of the chuck which has been described so far is as follows:

If a workpiece is to be clamped between the fixed chuck jaw 4 and the movable chuck jaw 7, then the handcrank 25 is rotated. Since the locking bolt 36 is pressed by the spring 41 into the recess 37 of the plate 17, upon rotation of the hand-crank 25 the plate and the air cylinder 13 which is connected rotationally fixed to it is also rotated. At the same time the also fixedly connected housing 12 and the hollow spindle 9 which is connected to said housing also rotate. As soon as the movable chuck jaw 7 abuts against the workpiece, an increased resistance results and the locking bolt 36 is urged out of the recess 37. Upon further rotation of the handcrank 25, the rotary slide valve 18 is rotated relative to the plate 17. The relative rotary motion of both parts is hereby limited by the stop pin 23 which is moved from its position which is shown in full lines in FIG. 5 into the dash-dotted position, until it engages the other side of the recess 24. In this end position of the rotary slide valve 18, its air-supply opening 19 is in alignment with the first axial bore 20 of the plate 17. Thus compressed air communicates with the cylinder chamber 16 and the air-operated piston 14 is, according to FIG. 1, moved to the left. Its piston rod 15 enters the cylinder chamber 12 of the hydraulic power amplifier and moves its secondary member 11 in reversed relationship of the cross-sectional surfaces of the piston 11a and of the piston rod 15. The secondary member 11 acts in turn onto the pressure rod 10 and presses the movable chuck jaw 7 with the desired high clamping force against the workpiece.

If the clamping pressure is to be cancelled again, the handcrank is moved in the reversed direction of rotation. This causes first the rotary slide valve 18 to rotate in a reversed direction of rotation until its stop pin 23 hits again the other side of the recess 24. Through this the vent 21 of the rotary slide valve 18 comes into connection with the second axial opening 22 of the plate 17. The second end position, which one can refer to as the ventilating position, is illustrated in FIG. 5. The air can escape from the cylinder chamber 16 and due to the cup springs 42 a sufficiently great counterpressure is produced in the hydraulic power amplifier, which counterpressure returns through the piston rod 15 the air-operated piston 14 again into its initial position. The locking bolt 36 engages again the recess 37. During a further backward rotation of the handcrank 25 the movable chuck jaw 7 can also be removed from the workpiece surface for a greater amount.

As one can recognize from FIG. 1, it is possible due to the eccentric arrangement of the hexagonal recess 26 to change the effective length of the lever arm of the handcrank 25 from a long handled lever arm H1 to a small handled lever arm H2 depending on the position of rotation the crankpin 27 is inserted into the recess 26.

During chucking of flexible workpieces, as for example sheet metal packages, it is necessary first to block the torque coupling which is formed by the locking bolt 36, the recess 37 and the spring 41 until the flexible workpiece or the sheet metal package are sufficiently compressed by manual rotation of the handcrank 25 and the hollow spindle 9. In order to block the torque coupling, an axial force in direction B is simply applied to the handcrank. Through this the crankpin 27 presses onto the flange 40a of the blocking bolt 40 and its flange engages the rear end of the locking bolt 36. The spring 41 is thus rendered ineffective and the locking bolt 36 is pressed into the recess 37 with an increased force depending on the force which is applied in axial direction onto the handcrank. The rotary slide valve 18 and plate 17 are blocked against one another until the axial force on the handcrank is cancelled. A further unchucking by means of compressed air takes then place in the above-described manner by moving by means of further rotation of the handcrank the rotary slide valve 18 from its ventilating position into its chucking position and thus bringing the air-supply opening 19 in connection with the axial opening 20.

To supply the compressed air into the rotary slide valve 18, same has preferably at its rear free face a threaded connection 43 for connection to a compressed-air source. This can be a commercial connector, for example a quick-type connection wherein the connector has two parts which are rotatable relative to another for more than 360° so that the entire chuck can be rotated several times about its axis.

In chucks of the described type, it is sometimes necessary to limit the maximum clamping pressure. For this purpose the plate 17 and the rotary slide valve 18 each have a central axial opening 44 and 45, respectively. A stop bolt 46 is arranged in said axial openings, which bolt 46 has at its front end which faces the air-operated piston 14 a smooth cylindrical shaft 46a which is sealed off with respect to the axial opening 44 of the plate 17 by means of a seal 47. The stop bolt 46 has at its rear end a clamping head 46b which is larger in diameter than the shaft 46a. An internal thread 48 is furthermore provided in the plate 17. In order for the stop bolt 46 not to be able to slip unintentionally out of the axial opening 45, said axial opening is reduced in diameter at its rear end by a flange 49 or the like.

Figure 2:
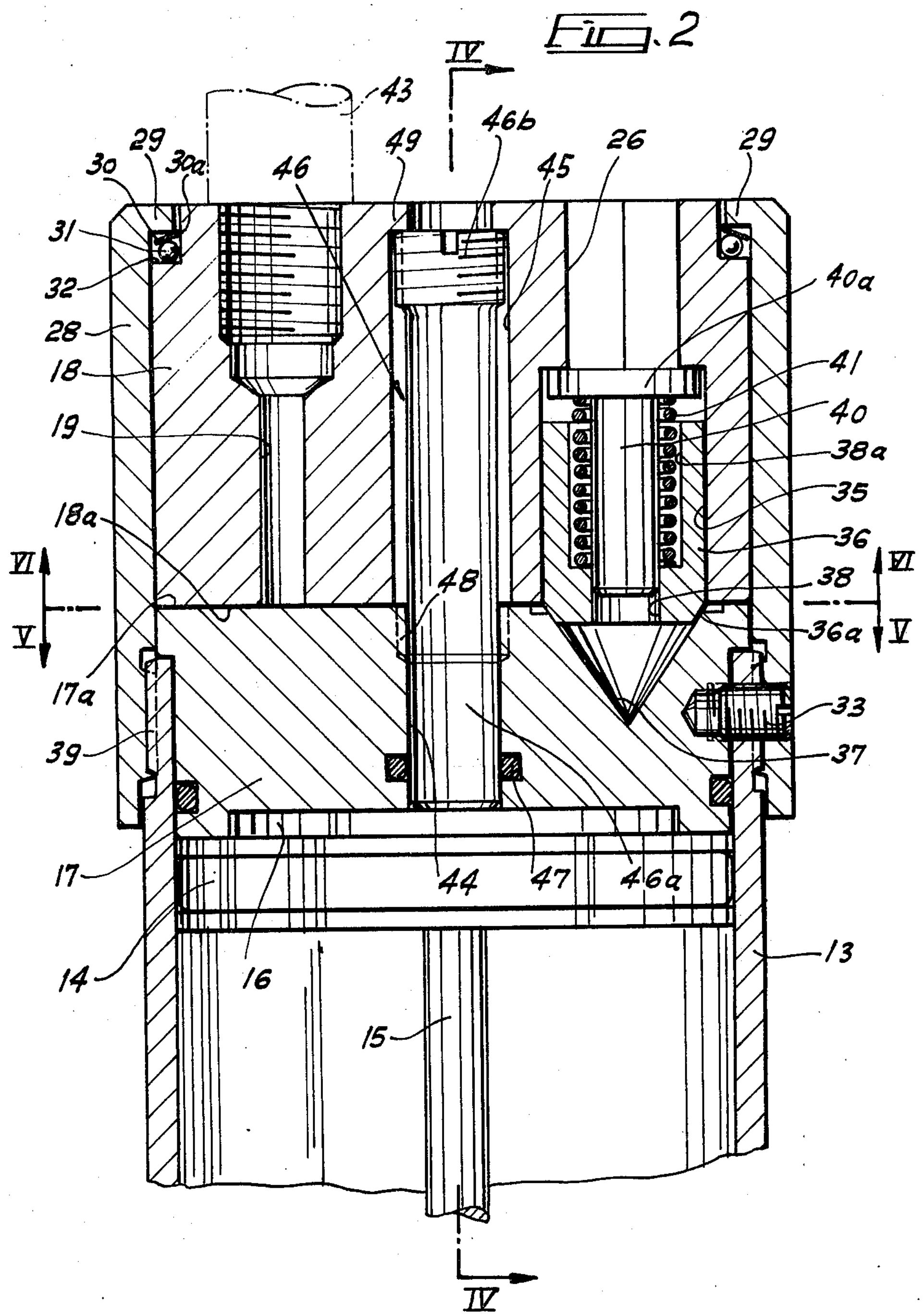
FIG. 2 is a partial longitudinal cross-sectional view of an air cylinder, plate and rotary slide valve of this chuck approximately in double size.

Should the chuck have the full clamping pressure, then the stop bolt 46 assumes the position illustrated in FIG. 2. Should, however, the maximum clamping pressure be reduced for example to half, then the chuck is first moved into the chucking position. The stop bolt 46 can now be moved axially into the cylindrical chamber 16 by means of a screw driver. By rotating the clamping head 46b into the internal thread 48 of the plate 17, the stop bolt 46 can be fixed axially with respect to the plate 17 with few rotations. It now projects with its cylindrical shaft 46a into the cylinder chamber 16. If one now moves the rotary slide valve 18 into ventilating position, then the air-operated piston 14 can move back only at half of its stroke, and accordingly the secondary member of the hydraulic power amplifier also reaches only an intermediate position, which corresponds to half the stroke. If the air-operated piston is later again placed under pressure, the maximum achievable clamping pressure has therewith been reduced in a simple manner to half the pressure.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a chuck, in particular a machine vise comprising a hollow spindle which is threadedly engaged with a stationary vise part, a pressure rod which is axially movably supported in said hollow spindle and which exerts the clamping pressure, a hydraulic or mechanical power amplifier which is arranged in a cylindrical housing which is connected to the hollow spindle, a secondary member of said power amplifier acting onto the pressure rod and the primary member of said power amplifier being under the power of an air-operated piston, which itself is arranged in an air cylinder which is connected to the power amplifier housing and is fixedly connected to same and the air cylinder has at its rear end not facing the hollow spindle a plate which seals off the cylinder chamber, at the rear face of which plate there sealingly abuts a rotary slide valve which can be rotated with respect to the plate between two end positions and which is coaxial to said plate, in the first end position of which rotary slide valve an axial air-supply opening, which is constantly in connection with a compressed-air source, is in alignment with a first axial opening of the plate, which leads into the cylinder chamber, and in the second end position of which rotary slide valve an axial vent is connected to a corresponding axial opening of the plate and including engaging means for a handcrank are provided on the rotary slide valve and between the rotary slide valve and the plate there is provided a spring-loaded torque coupling which holds the rotary slide valve in the ventilating position, the improvement comprising wherein the rotary slide valve is arranged in a sleeve which concentrically surrounds said rotary slide valve, is connected to the air cylinder at its one end through a fine thread connection and is secured against rotation after axial adjustment, which sleeve has at its other end a radially inwardly directed flange or the like, wherein between said flange and the rotary slide valve there is provided an initially tensioned axial ball bearing.

2. The improved device according to claim 1, wherein between the flange and the ball bearing there is provided an axially springy ring.

3. The improved device according to claim 2, wherein the axially springy ring is a cup spring.

4. The improved device according to claim 3, wherein the cup spring forms at the same time the one bearing ring of the ball bearing and is supported with its inner edge on the flange, while the rotary slide valve consists of hardened material and has a shoulder on which the balls are supported directly.

5. The improved device according to claim 2, wherein the axially springy ring is V-shaped in cross section, is supported with its apex on the flange of the sleeve and forms with its two V-legs bearing surfaces for the balls, while the rotary slide valve consists of hardened material and has a shoulder on which the balls are supported directly.

6. The improved device according to claim 1, wherein the torque coupling is a spring-loaded locking member which is movable in the rotary slide valve in an axial opening which is arranged eccentrically, which locking member engages in the ventilating position of the rotary slide a conical recess in the plate, wherein as an extension of the axial opening a multi-edge recess which is connected to said axial opening is provided for engagement of the correspondingly constructed crankpin of the handcrank and that a strain bolt is arranged movably in the axial opening, against which strain bolt rests the free end of the crankpin and which upon axial pressure onto the crankpin in direction (B) of the plate comes to rest on the locking member and blocks same.

7. The improved device according to claim 6, wherein the locking member is constructed as a cylindrical locking bolt, which is constructed frustrum-shaped at its front end which faces the plate for engagement in the conical recess of the plate and which has a central opening therein, in which the strain bolt is guided, wherein a pressure spring is provided in an enlargement of the central opening, which pressure spring is supported at one end on the shoulder of the enlargement and at the other end on a flange of the blocking bolt.

8. The improved device according to claim 6, wherein the diameter of the axial opening is larger than the largest diagonal of the multi-edge recess which is in alignment with it.

9. The improved device at least according to claim 1, wherein the plate and the rotary slide valve each have a central axial opening in which a stop bolt is arranged, which at its front end which faces the air-operated piston has a smooth cylindrical shaft which is sealed off with respect to the axial opening of the plate and at its rear end has a clamping head which is larger in diameter with respect to the shaft, which clamping head can be screwed into an internal thread in the plate.

10. The improved device according to claim 1, wherein the rotary slide valve has at its rear, free face a connector for connection to the compressed-air source.

* * * * *